US006836317B1

(12) United States Patent  (10) Patent No.: US 6,836,317 B1
Perger  (45) Date of Patent: Dec. 28, 2004

(54) METHOD FOR OPTICALLY MEASURING DISTANCE

(76) Inventor: Andreas Perger, Gentzgasse 43, A-1180, Vienna (AT)

(*) Notice: Subject to any disclaimer, the term of this patent is extended or adjusted under 35 U.S.C. 154(b) by 0 days.

(21) Appl. No.: 09/700,823

(22) Filed: Nov. 20, 2000

(30) Foreign Application Priority Data

May 19, 1998 (AT) ............................................ A 854/98

(51) Int. Cl.$^7$ ................................................. G01C 3/08
(52) U.S. Cl. ...................... 356/5.08; 356/5.01; 356/5.05
(58) Field of Search ...................... 356/5.01, 4.01–5.15, 356/5.02

(56) References Cited

U.S. PATENT DOCUMENTS

| | | | | |
|---|---|---|---|---|
| 3,503,680 A | * | 3/1970 | Schenkerman | 356/5 |
| 3,645,624 A | * | 2/1972 | Schenkerman | 356/4 |
| 4,125,835 A | * | 11/1978 | Barry | 356/5 |
| 4,384,199 A | * | 5/1983 | Ogino et al. | 250/204 |
| 4,699,508 A | * | 10/1987 | Bolkow et al. | 356/5 |
| 4,879,461 A | * | 11/1989 | Philipp | 250/221 |
| 5,179,286 A | * | 1/1993 | Akasu | 280/561 |
| 5,353,110 A | * | 10/1994 | Jones | 356/73.1 |
| 5,504,570 A | * | 4/1996 | Akasu | 356/5.05 |
| 5,699,151 A | * | 12/1997 | Akasu | 356/5.01 |
| 5,760,887 A | * | 6/1998 | Fink et al. | 356/5.03 |
| 5,805,468 A | * | 9/1998 | Blohbaum | 364/569 |
| 5,870,180 A | * | 2/1999 | Wangler | 356/4.01 |
| 6,115,113 A | * | 9/2000 | Flockencier | 356/5.01 |
| 6,259,514 B1 | * | 7/2001 | Yoshida | 356/3.04 |
| 6,259,515 B1 | * | 7/2001 | Benz | 356/5.08 |

FOREIGN PATENT DOCUMENTS

| | | | | |
|---|---|---|---|---|
| DE | 0 437 417 A2 | * | 7/1991 | G01S/17/10 |
| EP | 0 805 359 A2 | * | 5/1997 | G01S/7/487 |

* cited by examiner

Primary Examiner—Bernarr E. Gregory
Assistant Examiner—Brian Andrea
(74) Attorney, Agent, or Firm—Fitch, Even, Tabin & Flannery; George H. Spencer; Norman N. Kunitz

(57) ABSTRACT

The invention relates to a method of measuring the distance between a fixed point and an object, by the steps of:

Figure 1:
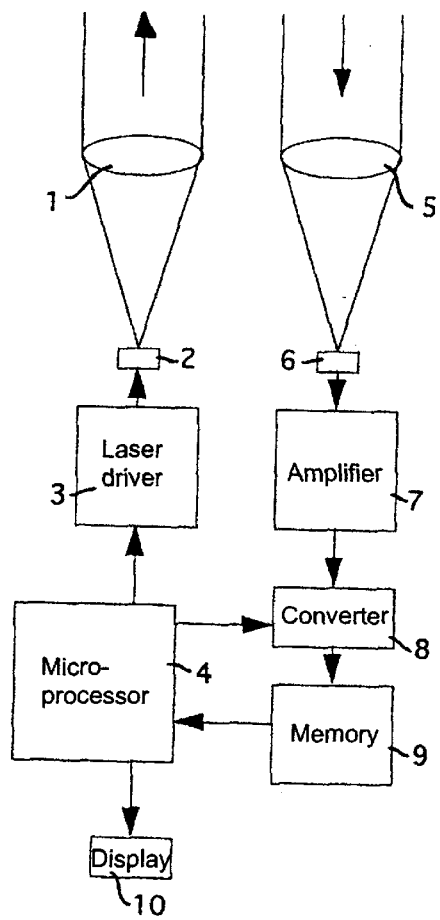

a) transmitting a light pulse (11) from the fixed point at a selected instant of transmission;

b) periodically scanning of light intensity received at the fixed point and continuously storing, as a set of received scanned signal values, the scanned values at the scanning rate during a predetermined measuring time window (13) embracing the instant of reception of the light pulse reflected from the object;

c) repeating steps a) and b) N number of times in order to obtain N number of sets of received signal values;

d) summing the individual stored sets of received scanned signal values, set by set, to a summed scanned value set during a calculating window (14) following the N measuring time windows (13);

e) repeating steps a) through d) in order to obtain a further summed scanning value set, whereby during or following step d) the further summed scanned value set is added, scanned value set by scanned value set, to the present summed scanned value set to actualize the latter, and whereby an equalizing portion of a summed scanned value set is optionally subtracted therefrom before and/or after the mentioned addition;

f) searching within the summed scanned value set for significant scanning values which satisfy predetermined threshold values;

g) repeating steps e) and f) until significant scanning values have been detected; and h) determining the looked-for distance from the position of the detected Significant scanning values in the summed scanned value set.

7 Claims, 2 Drawing Sheets

METHOD FOR OPTICALLY MEASURING DISTANCE

BACKGROUND OF THE INVENTION

1. Field of the Invention

The present invention relates to a method of measuring the distance between a fixed point and an object by optical pulse time delay measurement, including the steps of:
a) transmitting a light pulse from the fixed point at a selected instant of transmission;
b) periodically scanning (sampling) of light intensity received at the fixed point and continuously storing, as a set of received scanned (sampled) signal values, the scanned (sampled) values at the scanning (sampling) rate during a predetermined measuring time window embracing the instant of reception of the light pulse reflected from the object;
c) repeating steps a) and b) N number of times in order to obtain N number of sets of received signal values, wherein N is an integer equal to or greater than 1;
d) summing the individual stored sets of received scanned (sampled) signal values, set by set, to a summed scanned (sampled value set during the calculating time window following the N measuring time windows.

By summing the N received signal scanned value sets, the signal to noise ratio of the received signal is improved proportionally to the root of N. The echo (the reflection) of the light pulse is sought in the sum signal, and the distance may be derived on the basis of the known equation of distance equaling half the product of scanned value number of the echo, pulse rate and speed of light.

2. The Prior Art

The described principle of improving the signal to noise ratio has been known for a long time and has been described in Optical and Quantum Electronics, Vol. 7, No. 3, 1975, pp. 179–185. The disadvantage of the known method is that for a ten-fold increase of the signal to noise ratio it is necessary to store 100 sets of received signal scanning values of, for instance, 1,000 scanning values which thus requires 100,000 memory locations.

On the other hand, a second group of optical distance measuring methods is known from EP 0,312,524, in which real time calculation of the sum scanning value is performed during scanning. Each scanned value is continually added at the scanning frequency rate to corresponding scanning values which are present already. While the requisite storage requires (in the example referred to) only 1,000 cell, it is necessary to provide considerable computing power, since the time available for adding two values at a conventional scanning frequency of, e.g., 20 MHZ amounts to only a few nanoseconds. This requires either powerful application specific integrated circuits (ASICs) or digital signal processors which makes the construction of corresponding circuits as expensive as the large storage components of the first group of methods.

Moreover, in praxi it is not possible to gain time by real time processing since the pulse repetition rate of conventional laser diodes for thermal reasons as well as for reasons of eye safety is limited to a range of about 10 kHz. The time between termination of a scanning operation (at a distance of 1,000 m, for instance, this amounts to about 6.6 µs following the transmission of a laser pulse) and transmission of the next laser pulse remains unused in practice.

OBJECT OF THE INVENTION

It is, therefore, an object of the invention to provide a method of distance measuring, based upon the optical impulse time delay method, of improved signal to noise ratio as a result of received signal summation, which may be realized by circuit means which are simpler and more cost-efficient than those of known methods, and which, considering the operational limitations of conventional light pulse sources, allows to perform measurements in a short time period.

BRIEF SUMMARY OF THE INVENTION

The object is accomplished by a method of the kind referred to supra which includes the further steps of:
e) repeating steps a) through d) in order to obtain a further summed scanning value set, whereby during or following step d) the further summed scanned value set is added, scanned value set by scanned value set, to the present summed scanned value set to actualize the latter, and whereby an equalizing portion of a summed scanned value set is optionally subtracted therefrom before and/or after the mentioned addition;
f) searching within the summed scanned value set for significant scanning values which satisfy predetermined threshold values;
g) repeating steps e) and f) until significant scanning values have been detected; and
h) determining the looked-for distance from the position of the detected Significant scanning values in the summed scanned value set.

In this manner, time separated pulse trains of successive individual pulses are transmitted. The received signal scanned value sets of the individual pulses are merely stored during scanning and are summed only after reception of a complete pulse train. However, the summed scanned value sets of successive pulse trains are summed during the pauses between the impulse trains.

The invention is based upon the recognition that arrangements of conventional light pulse sources, such as laser diodes, may be operated to provide pulse trains, with sufficient time being provided between pulse trains to perform "slow" calculations so that the necessary circuits can be provided as simple and cost-efficient micro-processors. Only a few received signal sets have to be incorporated in the individual pulse trains so that no large storage devices will be required. Moreover, the reduction of the summed scanned value sets by their equalizing portion following each pulse train reduces the bit width of the scanned value sets to be stored so that the storage need be of small depth only.

Based on actual trails to be described hereafter it has been found that a particularly advantageous compromise may be achieved between the mentioned opposite requirements if in accordance with a preferred embodiment of the invention the calculating time window is 4 to 16 times, preferably from about 8 to 10 times, the N measuring time windows.

Increased resolution may be obtained if preferably in step h) the center of gravity of the significant scanning values is used as the position.

Furthermore, it is particularly advantageous if in case of several spaced groups of significant scanning values a first group which is markedly wider than the next group is ignored in steps f) to h). In that manner the target echo may be distinguished from an echo resulting from visual interference as may occur at close range and which typically is wider than the target echo.

In order to prevent a background from distorting the measurement when measuring an object in front of such background the last group or groups are preferably ignored in steps f) through h) when there are several groups of significant scanning values spaced from each other.

DESCRIPTION OF THE SEVERAL DRAWINGS

The invention will hereafter be described in greater detail on the basis of an embodiment, with reference to the drawings, in which:

FIG. 1 is a block circuit diagram of an apparatus suited for practicing the method; and FIGS. 2a through 2e are time diagrams (hereinafter also referred to as "histograms") of scanning value sets occurring during the process.

DETAILED DESCRIPTION OF THE EMBODIMENTS

FIG. 1 shows the basic structure of a range finder which may be used for practicing the method. A laser driver 3 which is triggered by a micro-processor 4 generates short electrical pulses which are transformed by a laser diode 2 to light pulses. The duration of the light pulses typically is in the range of several 10 nanoseconds. The light impulses emitted by the laser diode 2 in an angular field are changed by a transmission lens 1 to a substantially parallel beam which is directed towards an object (not shown). Since the object as a rule reflects in a diffuse manner a small fraction of the transmitted light energy is reflected in the direction of a receiving lens 5.

The light signal received by the lens 5 consists of light pulses which are of a shape (provided the target object is not too extended) similar to, but substantially weaker than, the transmitted light pulses, and it is delayed by a time delay T corresponding to the travel time of the light from the transmitter to the target object and from the target object to the receiver. Since transmitter and receiver relative to the distance to the target are arranged very closely to each other, the distance to the object is calculated as $c=T*c/2$, c being the speed of light in air.

The receiver lens 5 focusses the reflected light pulses on a photo diode 6. The generated photoelectric current is amplified by an amplifier 7 to a level which may be processed by an analog to digital converter 8 at the output end of the amplifier 7. The output signal consists not only of the electrical pulses derived from the light pulses by also of noise originating with the amplifier 7 and the photo diode 6.

Owing to the limited peak capacity of currently available laser diodes the pulse amplitude may at large distances even be lower than the noise (signal to noise ratio less than 1). It is for this reason that the following method is being used.

Simultaneously with the transmission of a laser pulse scanning of the received signal (output signal of the amplifier 7) commences by means of the A/D converter 8. The A/D converter 8 scans at a frequency of, e.g., several 10 MHZ. Each scanning value corresponds to a distance window of several meters. As many scanning values are received as correspond to the desired maximum distance. The scanning values are deposited as a scanning value set in a storage. Thereafter, another laser pulse is transmitted, and a new scanning operation is carried out. Again, a scanning value set is stored.

In this manner pulse trains of, for instance, 16 pulses are transmitted and 16 scanning value sets are stored. Thereafter, all of the 16 scanning value sets will be summed, scanning value set by scanning value set, to a summed scanning value set. As at 16 pulses and a 4 bit resolution of the A/D converter the summed values can at most have 8 bits a calculating and summing storage depth of 8 bits is sufficient for the summation and for receiving the summing value set.

In terms of eye safety and load of the laser 16 pulses may for practical purposes be transmitted at a pulse train frequency of up to about 100 kHz. This results in low loss of time. After a pulse train there is sufficient time to perform the summation for which a simple micro-processor suffices.

The summed scanning value set is then searched for a significant signal which might correspond to a light pulse. This may be carried out by cross-correlation with the original shape of the light pulses and by threshold value comparison of the result of the correlation, or merely by threshold value comparison of the scanning values or neighboring scanning value groups. Significant scanning values must at any rate satisfy a certain threshold criterion.

The distance measurement is terminated when significant scanning values in the summed scanning value set are found. This results in a favorable short measuring time and low energy consumption.

If no significant scanning values can be found, i.e., if there is no sufficient signal to noise ratio, the storage depth will not have been used, and a value from all the scanning values is subtracted from the summed scanning value set so that the smallest summed scanning value is zero. The value to be subtracted will hereafter be referred to as "offset" or "equalizing value". This may also be an equalizing value in the sense of mathematics.

The next pulse train will now be transmitted and processed as described above. Again, an offset is subtracted from the summed scanning value set so that the storage depth remain as small as possible. The summed scanning value set is added to the one of the previous pulse train and is stored as a substitute for the latter. If necessary, an offset is subtracted again. The summed scanning value set actualized in this manner is again searched for the presence of significant scanning values.

This process will be repeated until a sufficient signal to noise ratio has been reached, but in no case more often than 256 times, which leads to a total pulse count of about 4,000. By subtraction of an offset the summed scanning value set can always be maintained within the limit of 8 bits provided the resolution relative to the noise amplitude has been selected correctly.

An example of the method including actual numeric values will hereafter be described on the basis of FIG. 2.

EXAMPLE

Figure 2A:
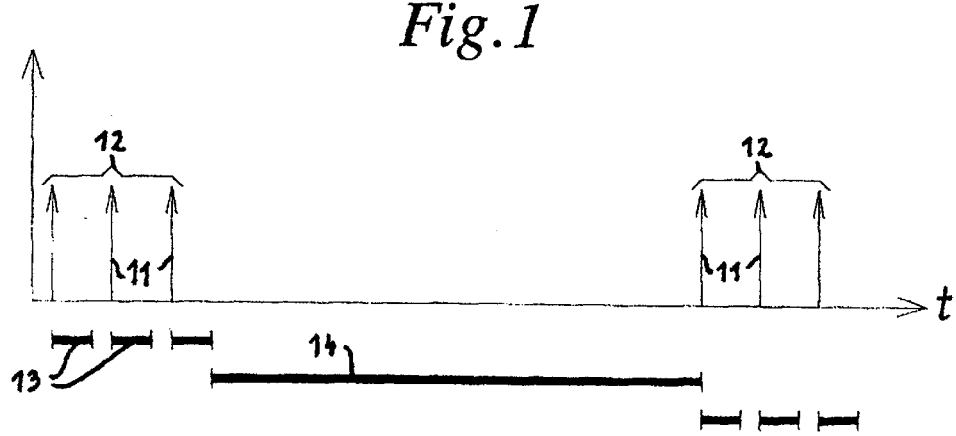

FIG. 2a schematically shows the progress over time of the transmission of laser pulses over a time t.

16 laser pulses are transmitter per pulse train 12. Only the first three pulses are being shown. The transmission rate of the laser pulses 11 in a pulse train 12 was 100 kHz; hence, the spacing between the laser pulses 11 was 10 $\mu$s.

Following each laser pulse 11 the received signal was scanned at 20 MHZ during a measuring time window 13. Each scanning value thus corresponded to 50 ns or 7.5 m. 128 scanning values in a scanning value set were stored, thus corresponding to a measuring time window 13 of 6.4 $\mu$s (corresponding to a maximum distance of 960 m).

After 16 laser pulses 11 there was a pause of 1.44 ms duration, and thereafter the next pulse train 12 was transmitted. On chronological average, 16 light pulses were transmitted every 1.6 ms which corresponds to an acceptable value for conventional laser diodes of an average repetition rate of 10 kHz.

The time of the pauses between the pulse trains 12 was used as calculating time 14 for summing the 16 scanning value sets of a pulse train 12 to a summed scanning value set. The calculating time window 14 was about 8 to 10 time the measuring time window 13.

Figure 2B:
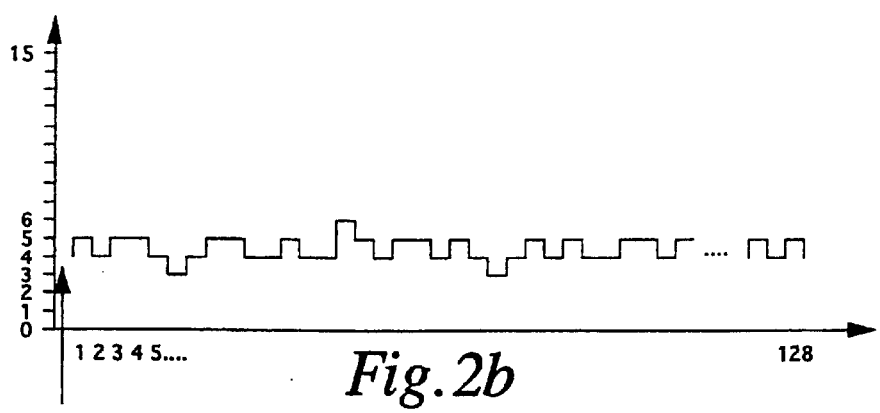

FIG. 2b depicts a histogram of the first scanning value set after the first laser pulse 11. No echo of a target object was to be seen. (At a small distance and large signal resulting therefrom it would be possible to detect a signal after only one pulse.) The amplification of the amplifier 7 was selected such that the standard deviation of the noise amounted to about 0.5 LSB (least significant bit). The offset was selected to be about 4 LSB.

Figure 2C:
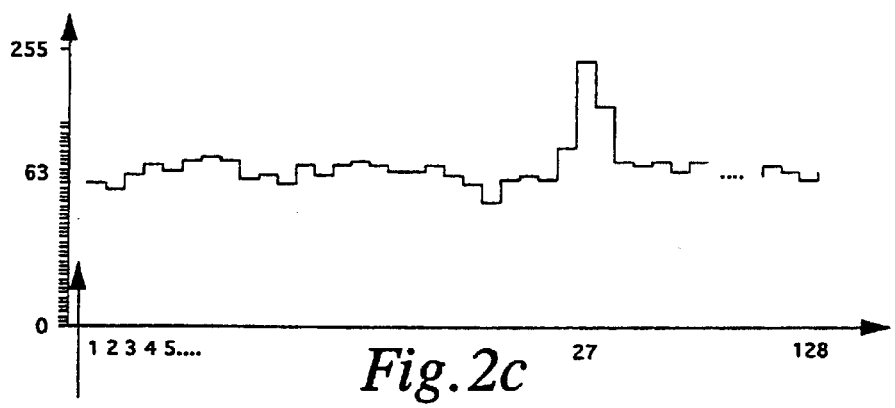

FIG. 2c depicts the summed scanning value set following the first pulse train 12. The offset (equalizing portion, mean value) had increased to 16×4=64 LSB and the standard noise deviation had increased to about $0.5 \times \sqrt{16} = 2$ LSB. The signal had increased by the factor 16, and the signal to noise ratio has increased by the fact 4. With a summed scanning value set as depicted in FIG. 2c the distance measuring would be terminated and the distance would be shown as 27×7.5 m=292.5 m (echo at scanning value 27).

Figure 2D:
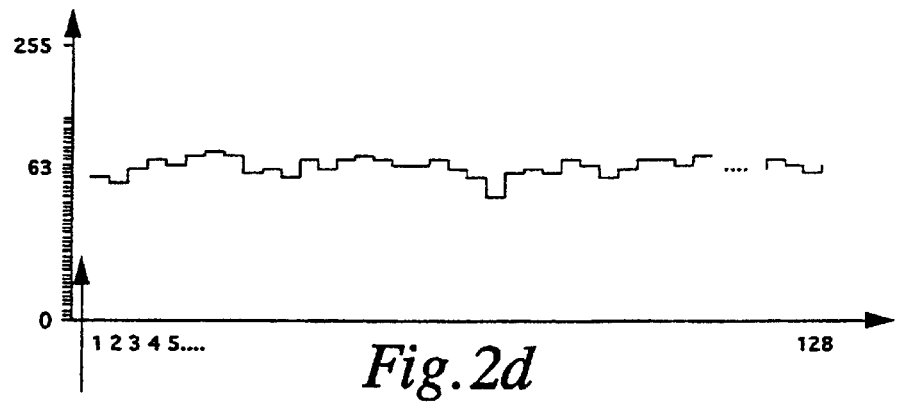
Figure 2E:
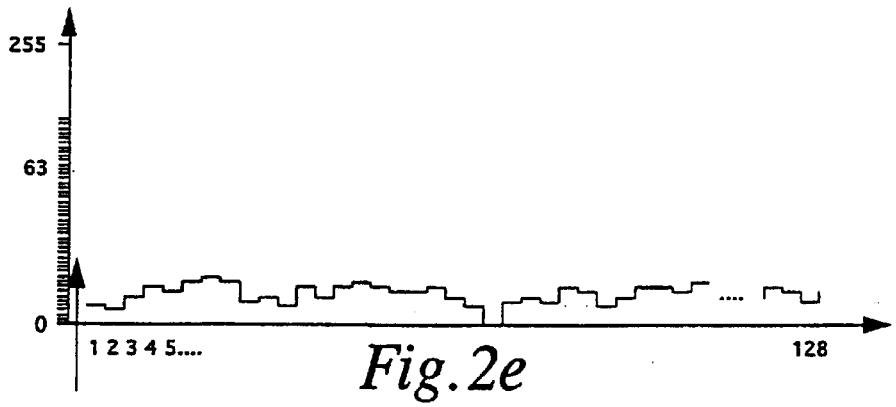

FIG. 2d depicts a summed scanning value set without a sufficiently strong echo signal after the first pulse train. One offset was subtracted (FIG. 2e).

After summation of 256 pulse trains 12 of 16 pulses 11 each the standard deviation of noise amounted to about 32 LSB; the average value was about 100 LSB, the peak range of useful signals was about 150, and the signal to noise ratio was about 8. Signal to noise ratios of about 4 to 5 would be sufficient. The entire measuring time for the 4,096 pulses was 0.4096 s.

The time available during each calculating time window 14 was 1.4 ms for 128×16=2,048 additions, 128 subtractions for offset correction, as well as a further 128 additions for summation to the previous summed scanning value set. Hence, there were about 600 ns for each 8 bit calculation. Relatively simple computers were sufficient for this operation. The need for storage amounted to 16×128 4-bit storage spaces, i.e. 1,024 bytes plus 128 bytes for the summed scanning value set.

By comparison, a method of the first group described in the opening paragraphs requires a storage of 128×4,096 4 bit storage spaces, i.e. in excess of 260 kbytes. Following the pulse transmission time of 0.4 s there will be an evaluation time. The additions are performed in 16 bit technology. While methods of the second group described in the opening paragraphs manipulate storage and evaluation time in a manner similar to the method here described, but have only 50 ns available for each 16 bit addition.

The proposed method may be refined by not only examining at which scanning value of the summed scanning value set the highest sum signal occurs but by selecting the signal from such that the echo signal sweeps, for instance, over 2 to 3 and that an improved resolution is obtained for formation of the center of gravity.

Furthermore, it is possible to distinguish an echo from the target object from an echo resulting from visual interference by the fact that the latter typically occurs at close range and is noticeably wider (having a width, for instance, of 7 or 8 scanning values).

At the occurrence of several target object echos only one of them is usually of interest. The other echos typically originate with objects in the foreground (branches of trees, etc.) which are not to be measured. Also, when measuring an object in front of a background it is possible that the background could also be measured, particularly at greater distances with the measuring beam opening at a certain angle of divergence is larger than an object to be measured. This may be avoided by interpretation of the histogram as it always shows the first one of two target objects, except in cases where the first object is located at a distance less than 100 m.

What is claimed is:

1. A method of measuring the distance between a location and an object by optical pulse delay measurement, comprising the steps of:
   a) sending a light pulse from the location to the object at a first instant for reflection from the object and subsequent reception at the location as a reflected light pulse at a second instant for conversion into a received signal;
   b) time discrete sampling of the received signal at a sampling clock rate during a first predetermined period including at least the second instant for obtaining samples of the received signal, the samples being stored, sample by sample, at a rate of storing equal to the sampling clock rate, to produce a stored set of received signal samples;
   c) repeating steps a) and b) N number of times to obtain N stored sets, wherein N is an integer equal to or greater than 1;
   d) summing the N stored sets, sample by sample, at a rate of summing slower than the sampling clock rate during a second period of time following the N first periods of time to produce a stored summed set;
   e) repeating steps a) through d) to obtain at least one further stored summed set and updating the stored summed set by adding thereto the further stored summed set, sample by sample, at a rate slower than the sampling clock rate;
   f) searching within the updated stored summed set for significant samples satisfying at least one predetermined threshold value;
   g) repeating steps e) and f) until significant samples have been found; and
   h) determining the distance from the position of the significant samples.

2. The method of claim 1, wherein in step e) any DC offset of any of the stored summed sets is subtracted therefrom before and/or after the adding.

3. The method of claim 1, wherein the second selected period of time is 4 to 16 times the N first selected periods of time.

4. The method of claim 1, wherein the second selected period of time is 8 to 10 times the total raised of the N first selected periods of time.

5. The method of claim 1, wherein in step h) the position is the center of gravity of the found significant samples.

6. The method of claim 1, wherein in case of several spaced groups of significant samples being found, a first group which is significantly broader than the subsequent group is disregarded in determining the distance.

7. The method of claim 1, wherein in case of several spaced groups of significant samples being found, at least the last group is disregarded in determining the distance.

* * * * *